United States Patent [19]
Roland et al.

[11] Patent Number: 5,961,809
[45] Date of Patent: Oct. 5, 1999

[54] CHROMIUM-FREE PROCESS FOR IMPROVING PAINT ADHESION AFTER THIN-LAYER ANODIZATION

[75] Inventors: Wolf-Achim Roland, Solingen; Andreas Nowak, Cologne, both of Germany

[73] Assignee: Henkel Kommanditgesellschaft auf Aktien, Duesseldorf, Germany

[21] Appl. No.: 08/913,179

[22] PCT Filed: Feb. 29, 1996

[86] PCT No.: PCT/EP96/00829

§ 371 Date: Sep. 8, 1997

§ 102(e) Date: Sep. 8, 1997

[87] PCT Pub. No.: WO96/27698

PCT Pub. Date: Sep. 12, 1996

[30] Foreign Application Priority Data

Mar. 8, 1995 [DE] Germany ............... 195 08 126

[51] Int. Cl.$^6$ ............ C23C 28/00; C23C 22/82; C23C 22/00; C25D 5/48
[52] U.S. Cl. ............ 205/199; 205/200; 205/201; 205/229; 148/272; 148/274; 148/275; 148/276
[58] Field of Search ............ 205/199, 200, 205/201, 229, 220; 148/272, 274, 275, 276

[56] References Cited

U.S. PATENT DOCUMENTS

| | | | |
|---|---|---|---|
| 3,622,473 | 11/1971 | Ohta et al. | 204/38 A |
| 3,912,548 | 10/1975 | Faigen | 148/6.15 R |
| 4,136,073 | 1/1979 | Muro et al. | 260/29.2 EP |
| 4,661,170 | 4/1987 | Osberghaus et al. | 148/6.27 |
| 4,921,552 | 5/1990 | Sander et al. | 148/247 |
| 4,992,116 | 2/1991 | Hallman | 148/247 |
| 5,129,967 | 7/1992 | Sander et al. | 148/247 |
| 5,158,622 | 10/1992 | Reichgott et al. | 148/247 |
| 5,226,976 | 7/1993 | Carlson et al. | 148/257 |
| 5,584,949 | 12/1996 | Karmaschek et al. | 148/247 |

FOREIGN PATENT DOCUMENTS

| | | |
|---|---|---|
| 0 008 942 | 3/1980 | European Pat. Off. . |
| 0 177 805 | 4/1986 | European Pat. Off. . |
| 0 319 017 | 6/1989 | European Pat. Off. . |
| 24 33 704 | 1/1975 | Germany . |
| 43 17 217 | 12/1994 | Germany . |
| 62-130295 | 6/1987 | Japan . |
| 3- 020 496 | 1/1991 | Japan . |
| 6-116519 | 4/1994 | Japan . |
| WO85/05131 | 11/1985 | WIPO . |
| 92/07973 | 5/1992 | WIPO . |
| WO92/07973 | 5/1992 | WIPO . |
| WO92/18661 | 10/1992 | WIPO . |

OTHER PUBLICATIONS

G. Steele, "Filiform Corrosion on Architectural Aluminum"—*Polymers Paint Colour J.*, 184(4345): 90–95 (Mar. 1994).

Ullmann's Encyclopedia of Industrial Chemistry, 5th ed. vol. 9: 174–76 (1987) No Month Available.

Technischen Richtlinien der GSB International, p. 35B, Mar. 1994.

*Primary Examiner*—Kathryn Gorgos
*Assistant Examiner*—Edna Wong
*Attorney, Agent, or Firm*—Ernest G. Szoke; Wayne C. Jaeschke; Norvell E. Wisdom, Jr.

[57] ABSTRACT

A process for improving the adherence of paint applied after thin-film anodization is characterized in that the anodized metal surfaces are brought into contact with an aqueous solution containing one or more of the following components: (a) 200 to 2000 ppm of a homopolymer or copolymer of acrylic acid, methacrylic acid, and/or their esters; (b) 200 to 3000 ppm of a poly(vinyl phenol) compound in which at part of the phenol rings carry an alkylamino substituent; (c) 200 to 3000 ppm of hexafluorotitanic acid, hexafluorozirconic acid, and/or their anions.

20 Claims, No Drawings

CHROMIUM-FREE PROCESS FOR IMPROVING PAINT ADHESION AFTER THIN-LAYER ANODIZATION

This is national stage application of PCT/EP96/00829 filed Feb. 29, 1996.

BACKGROUND OF THE INVENTION

This invention relates to a new chromium-free process by which the adhesion of paints, more particularly powder coatings, to metal surfaces subjected to thin-layer anodization to improve corrosion resistance is improved. The process sequence: thin-layer anodization—aftertreatment to improve paint adhesion—powder coating, is particularly suitable for suppressing so-called filiform corrosion.

TECHNICAL BACKGROUND AND RELATED ART

Filiform corrosion is understood to be the growth, under a layer of paint, of filament-like traces of corrosion which can occur under certain conditions of atmospheric moisture and electrolyte content. Painted architectural aluminium in costal regions is particularly susceptible to this form of corrosion. A discussion of the causes, manifestations and mechanisms of this form of corrosion can be found, for example, in: G. Steele, "Filiform Corrosion on Architectural Aluminium—A Review", *Polymers Paint Colour J.*, 184 (4345), pages 90 to 95 (March 1994). Although this form of corrosion can be checked by chromating before painting, it cannot be certainly prevented. An effective alternative to chromating as a pretreatment is so-called thin-layer anodization which, although extremely effective against filiform corrosion, is often attended by the problem of poor paint adhesion.

The electrochemical anodic oxidation of metals in suitable electrolytes known in brief as "anodization" is a widely used process for forming corrosion-controlling and/or decorative coatings on suitable metals. These processes are briefly characterized, for example, in *Ullmann's Encyclopedia of Industrial Chemistry*, 5th Edition, Vol. 9 (1987), pages 174–176. According to this literature reference, titanium, magnesium and aluminium and their alloys are anodizable, the anodization of aluminium and its alloys being of the greatest importance on an industrial scale. The electrolytically produced anodizing layers protect the aluminium surfaces against the effects of weathering and other corrosive media. In addition, anodizing layers are applied to obtain a harder surface and hence to achieve increased resistance to wear of the aluminium. Particular decorative effects can be obtained through the color of the anodizing layers or by adsorptive or electrolytic coloring. The anodization of the aluminium is carried out in an acidic electrolyte, sulfuric acid being the most widely used. Other suitable electrolytes are phosphoric acid, oxalic acid and chromic acid. The properties of the anodizing layers can be varied within wide limits through the choice of the electrolyte and its temperature and through the current density and the anodizing time. The anodizing process is usually carried out with direct current or with a direct current superimposed on alternating current.

Architectural aluminium is normally anodized in a layer thickness of up to about 20 micrometers that requires anodizing times of the order of 30 to more than 60 minutes. The anodizing layers thus applied are generally not painted, but are generally either left in their natural color or are adsorptively or electrolytically colored and then sealed. In this way, they offer protection against corrosion and have an aesthetic effect.

Relatively thin anodizing layers, for example with layer thicknesses of around 2 to at most 10 micrometers, can be produced by thin-layer anodization, but afford adequate protection against corrosion only in conjunction with subsequent painting. In principle, thin-layer anodization, which is occasionally also known as pre-anodization, may be carried out using the same electrolytes as employed for conventional anodization. The thin anodizing layers are obtained by applying reduced current intensities and/or reduced anodizing times. For example, anodizing layers around 5 micrometers thick can be obtained by the direct-current sulfuric acid process ("GS" process), providing aluminium panels are anodized in an electrolyte containing 180 g/l of sulfuric acid and 5 g/l of aluminium ions over a period of 5 minutes at 25° C. using a current density of 2 $A/dm^2$. As a pretreatment for avoiding filiform corrosion, thin-layer anodization in this form represents an attractive alternative to chromating, providing the problem of paint adhesion can be satisfactorily solved. For example, thin-layer anodization may be carried out at higher electrolyte temperatures than conventional anodization in order in this way to obtain larger pores in the anodizing layer to increase paint adhesion. However, this measure has not hitherto proved adequate for ensuring uniformly good paint adhesion for a variety of paint systems. A further improvement in paint adhesion can be obtained by subjecting the anodizing layer to a chemical aftertreatment before painting, which is the subject of the present invention.

Conversion processes for treating cleaned, but not anodized, aluminium surfaces to ensure firm paint adhesion are known from the prior art. Organic film formers, for example polyacrylates, are used in these known conversion processes, generally together with hydrofluoric acid and/or acids of complex fluorides. For example:

U.S. Pat. No. 5,129,967 and U.S. Pat. No. 4,921,552 disclose treatment baths for the no-rinse treatment (or dried-in-place conversion coating) of aluminium containing:

a) 10 to 16 g/l of polyacrylic acid or homopolymers thereof;

b) 12 to 19 g/l of hexafluorozirconic acid;

c) 0.17 to 0.3 g/l of hydrofluoric acid; and d) up to 0.6 g/l of hexafluorotitanic acid.

EP-B-8 942 discloses treatment solutions, preferably for aluminium cans, containing:

a) 0.5 to 10 g/l of polyacrylic acid or an ester thereof and b) 0.2 to 8 g/l of at least one of the compounds $H_2ZrF_6$, $H_2TiF_6$, and $H_2SiF_6$, the pH value of the solution being below 3.5, and a water-based concentrate for refreshing the treatment solution containing:

a) 25 to 100 g/l of polyacrylic acid or an ester thereof;

b) 25 to 100 g/l of at least one of the compounds $H_2ZrF_6$, $H_2TiF_6$, and $H_2SiF_6$; and c) a source of free fluoride ions which yields 17 to 120 g/l of free fluoride.

DE-G24 33 704 describes, for increasing paint adhesion and permanent corrosion control on, inter alia, aluminium, treatment baths which may contain 0.1 to 5 g/l of polyacrylic acid or salts or esters thereof and 0.1 to 3.5 g/l of ammonium fluorozirconate, expressed as $ZrO_2$. The pH values of these baths may vary over a wide range. The best results are generally obtained when the pH value is in the range from 6 to 8.

U.S. Pat. No. 4,992,116 describes treatment baths for the conversion treatment of aluminium with pH values of about 2.5 to 5 which contain at least three components, namely:

a) phosphate ions in a concentration range of $1.1 \times 10^{-5}$ to $5.3 \times 10^{-3}$ moles/l corresponding to 1 to 500 mg/l;

b) $1.1 \times 10^{-5}$ to $1.3 \times 10^{-3}$ moles/l (corresponding to between 1.6 and 380 mg/l, depending on the element) of a fluoro acid of an element selected from the group consisting of Zr, Ti, Hf and Si; and c) 0.26 to 20 g/l of a polyphenol compound obtainable by reaction of poly(vinylphenol) with aldehydes and organic amines.

WO 92/07973 teaches a chromium-free treatment process for aluminium which uses 0.01 to about 18% by weight of $H_2ZrF_6$ and 0.01 to about 10% by weight of a 3-(N-$_{1-4}$-alkyl-N-2-hydroxyethylaminomethyl)-4-hydroxystyrene polymer as key components in the form of an acidic aqueous solution.

DE-A-43 17 217 describes a process for the pretreatment of surfaces of aluminium or its alloys before a second, permanently corrosion-controlling conversion treatment, in which the surfaces are contacted with acidic aqueous treatment solutions which contain complex fluorides of the elements boron, silicon, titanium, zirconium or hafnium, either individually or in the form of mixtures with one another in total concentrations of the fluoro anions of 100 to 4,000 and preferably 200 to 2,000 mg/l and which have a pH value of 0.3 to 3.5 and preferably in the range from 1 to 3. The treatment solutions may additionally contain polymers selected from polyacrylates and/or reaction products of poly(vinyl phenol) with aldehydes and organic hydroxy-functional amines in concentrations below 500 mg/l and preferably below 200 mg/l.

U.S. Pat. No. 4,136,073 claims a chromium-free treatment process for aluminium surfaces in which the surfaces are contacted with acidic (pH 1.2 to 5.5) aqueous solutions containing an organic film former and a soluble titanium compound in a ratio by weight of polymer to titanium of 100:1 to 1:10. The preferred titanium concentration is between 0.01 and 5% by weight.

One feature common to the treatment processes described above is that they are applied to non-anodized aluminium surfaces. U.S. Pat. No. 5,226,976 describes an after-treatment process for pretreated metal surfaces, for example anodized aluminium surfaces, in which the anodizing layers are treated with a solution containing 25 to 5,000 ppm of a triazole and a poly(vinylphenol) compound in which the phenol rings, at least in part, carry a substituent corresponding to one of the following two formulae:

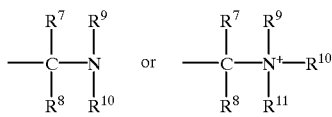

in which each of the substituents $R^7$ to $R^{11}$ is selected from hydrogen, an alkyl, aryl, hydroxyalkyl, mercaptoalkyl or phosphonoalkyl group, in addition to which $R^{11}$ may be —O⁻ or —OH, and at least one of the substituents $R^9$ and $R^{10}$ must comprise a polyhydroxyalkyl group emanating from the condensation of an amine or of ammonia with a ketose, an aldose, or other polyhydroxy compound containing 3 to 8 carbon atoms and subsequent reduction of the imino function to an amino function.

It is apparent from the context of this disclosure that the treatment in question is a passivating after-rinse by which the corrosion-controlling effect of the conversion layer previously applied, for example the anodizing layer, is improved. However, the disclosure in question does not teach using this process after thin-layer anodization to improve the adhesion of a subsequent coating.

The particular poly(phenol) derivatives which may be used for the purposes of the above-cited disclosure are only mentioned in detail in the first claim of EP-B-319 017 to which reference is hereby expressly made. A specific polymer from this group is, for example, a methyl glucamine derivative of a poly(vinylphenol) with a molecular weight of about 5,000 which may be prepared by reaction of the poly(vinylphenol) obtainable under the name of RESIN M from Maruzen Oil (USA) with N-methyl glucamine and formaldehyde in the presence of an acid as catalyst and which represents the active component of the conversion and aftertreatment solution PARCOLENE® 95 AT of Parker Amchem, a subsidiary of Henkel Corp., USA.

The problem addressed by the present invention was to provide a process by which the adhesion of a subsequent coating, more particularly a powder coating, after thin-layer anodization could be improved. Such a process would be of particular importance for the protection of architectural sections of painted aluminium against the filiform corrosion described at the beginning.

The expression "thin-layer anodization" is defined, for example, in the technical guidelines of GSB International (*Technische Richtlinien für die Arbeit der Gütegemeinschaft für die Stückbeschichtung von Bauteilen aus Aluminium e. V.* (GSB International). Publisher: RAL Deutsches Institut für Gütesicherung und Kennzeichung e. V., Bomheimer Str. 180, Bonn 1992; Teil 3, Güte- und Prüfbestimmungen,page 35B, March 1994). According to these guidelines, anodization is carried out by the direct-current sulfuric acid anodizing process ("GS" process) with the following bath parameters:

| | |
|---|---|
| electrolyte concentration | 180–200 g/l of $H_2SO_4$ |
| max. Al content | 15 g/l |
| chloride content | <0.1 g/l |
| temperature | 25–30° C. |
| current density | 1.5–3 A/dm² |
| layer thickness | 3–8 μm. |

BRIEF SUMMARY OF THE INVENTION

This problem has been solved by a process for improving paint adhesion after thin-layer anodization, characterized in that the anodized metal surfaces are contacted with an aqueous solution containing one or more of the following components:

a) 200 to 2,000 ppm of a homopolymer or copolymer of acrylic acid and/or methacrylic acid and/or esters thereof with an average molecular weight in the range from 20,000 to 150,000 and/or b) 200 to 3,000 ppm of a poly(vinyl phenol) compound in which the phenol rings, in part at least, carry a substituent corresponding to one of the following two formulae:

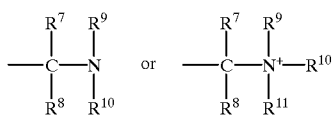

in which each of the substituents $R^7$ to $R^{11}$ is selected from hydrogen, an alkyl, aryl, hydroxyalkyl, mercaptoalkyl or phosphonoalkyl group, in addition to which $R^{11}$ may be —O⁻ or —OH and at least one of the substituents $R^9$ and $R^{10}$ must comprise a polyhydroxyalkyl group emanating from the condensation of an amine or of ammonia with a ketose, an aldose or other polyhydroxy compound containing 3 to 8 carbon atoms and subsequent reduction of the imino function to an amino function, and/or c) 200 to 3,000 ppm of hexafluorotitanic acid and/or hexafluorozirconic acid or anions thereof.

DETAILED DESCRIPTION OF THE INVENTION

Anodized metal surfaces in the context of the present invention are of course understood to be surfaces of anodizable metals, such as titanium, magnesium and aluminium and their alloys. The process is particularly intended for anodized aluminium surfaces, the expression "aluminium" encompassing technical aluminium alloys of which more than 90% by weight consist of aluminium. Examples of such alloys are the alloys AlMg1 and AlMgSiO.5. "Thin-layer anodization" is understood to be anodization of the type described in detail in the foregoing in which the anodizing layers can be produced in a thickness of about 2 to about 10 micrometers and, more particularly, in a thickness of 3 to 8 µm, for example in a thickness of about 5 micrometers.

Homopolymers or copolymers of the type mentioned in a) are commercially available, for example from Rohm & Haas. The concentration of such a polymer in the treatment solution is between 500 and 1,000 ppm. This polymer may be used together with components b) and/or c). However, if a polymer from group a) is employed, the poly(vinyl phenol) compound of group b) is preferably not used. Where a treatment solution containing a polymer from group a) is used, it is advisable for this aqueous solution additionally to contain hydrofluoric acid or anions thereof, preferably in concentrations of about 5 to about 50 ppm. Instead of or together with hydrofluoric acid, the treatment solution containing a polymer from group a) may additionally contain component c), 200 to 3,000 ppm of hexafluorotitanic acid and/or hexafluorozirconic acid or anions thereof. A corresponding treatment solution preferably contains between about 500 and about 1,500 ppm of these complex fluorides.

The pH value of an aqueous treatment solution containing a polymer from group a), optionally together with hydrofluoric acid and/or a component from group c), is preferably in the range from 2 to 5 and more preferably in the range from 3 to 4.

Aqueous treatment solutions which contain a poly(vinylphenol) compound from group b) may additionally contain components a) and c), but are preferably free from these components. Suitable poly(vinylphenol) compounds are described in detail in claim 1 of EP-B319 017 which is hereby included as part of the present disclosure. The above-mentioned reaction product of RESIN M is mentioned by way of example. This poly(vinyl phenol) compound is preferably used in a concentration of 500 to 2,000 ppm. Aqueous treatment solutions containing this component preferably have pH values of 6 to 10 and, more particularly, in the range from 7 to 9.

A treatment solution containing component b) optionally contains solubilizers also, because stable concentrates of these poly(vinylphenol) compounds can be obtained with the aid of solubilizers. The concentration of solubilizers in the treatment solution may be, for example, from 100 to 2,500 ppm. Suitable solubilizers may be selected from one or more of the compounds di- or triethylene glycol, di- or tripropylene glycol, mono-, di- or triethylene glycol monoethyl or propyl ether, mono-, di- or tripropylene glycol monoethyl or propyl ether.

The component from group c) may be used together with components a) and b), although the combination with component b) is less preferred. Component c) may advantageously be used without components a) and b), in which case the aqueous solution contains 200 to 3,000 ppm and preferably 500 to 1,500 ppm of hexafluorotitanic acid and/or hexafluorozirconic acid or anions thereof. The pH value of such a treatment solution is preferably in the range from 3 to 6 and more preferably in the range from 4 to 5. Accordingly, the hexafluoro acids, corresponding to their acid constants, are present partly in non-protolyzed form and partly in the form of their anions. The pH value of a solution of the free acids is raised to the preferred range by addition of alkali metal hydroxide solutions or preferably by addition of ammonia, ammonium hydrogen carbonate and/or aluminium hydroxide, so that the hexafluoro acids are preferably at least partly neutralized with ammonia.

These aqueous treatment solutions are preferably contacted with the anodized metal surfaces by immersing the metal parts in the treatment solutions or spraying them with the treatment solutions. The treatment solution preferably has a temperature of 25 to 55° C., because, at lower temperatures, the effectiveness of the treatment diminishes while higher temperatures do not produce any further advantage and unnecessarily add to the energy costs of the process. For example, the temperature of a treatment solution containing components a) and/or c) may be in the range from 30 to 40° C., for example 35° C. Treatment solutions containing component b) are preferably used at slightly higher temperatures, more particularly at a temperature of 40 to 50° C., for example 45° C. The treatment solutions are left to act on the metal surfaces for 30 to 300 seconds, preferably for 60 to 180 seconds and, for example, for 120 seconds.

The effect of the treatment solution is terminated by dilution of the treatment solution with water by spraying the surfaces removed from the treatment solution with water or by rinsing off the treatment solution from the surfaces by spraying them with water or immersing them in water. Deionized water is preferably used for this dilution or rinsing step. Removal of the treatment solution by spray-rinsing with water or by immersion in water is advisable when the treatment solution contains component b) and/or c). If a treatment solution containing component a) without component b) or c) is used, spraying of the treated surfaces with deionized water, for example for about 5 seconds, is sufficient.

After spraying with water or rinsing with water, the treated surfaces are preferably dried at elevated temperature, for example at a temperature of 50 to 80° C., to save time. This may be done in known manner, for example by exposing the treated metal parts to infrared radiation or to a stream of heated air or by placing them in a correspondingly adjusted drying oven.

After drying, the metal parts thus treated may be coated with a paint, preferably a powder coating. Corresponding examples can be found in the following Examples.

The ready-to-use treatment solutions described in the foregoing are preferably prepared by using concentrates, which are adjusted to the required concentration range with water in situ. The concentrates used should be present in the form of stable aqueous solutions with no tendency to form precipitates. However, the concentration of active substances in these concentrates should be as high as possible to ensure that unnecessary quantities of water do not have to be transported. Concentrates which provide the ready-to-use treatment solutions by dilution with water to a concentration of about 0.2 to about 5% by volume are suitable for use in the process according to the invention as described in the foregoing and are commercially available.

EXAMPLES AND COMPARISON EXAMPLES

The process was tested on plates of the alloy AlMg1 and on profile sections of the alloy AlMgSiO.5. Before the treatment step according to the invention, the test specimens were immersion-pretreated as follows:

degreasing: P3-ALMECO® 20, 60° C., 10 minutes, rinsing with water, pickling: P3-ALMECO® 40, 55° C., 10 minutes, rinsing with water, descaling: nitric acid (10–20% by weight), room temperature, 1 minute, rinsing with water, thin-layer anodization: direct current sulfuric acid process: 180 g/l sulfuric acid, 5 g/l Al(III), 25° C., 2 A/dm$^2$, 5 minutes; layer thickness: 5 micrometers, rinsing with water, rinsing with deionized water to a conductivity of <10 $\mu$S/cm.

The paint-adhesion-improving aftertreatment was then carried out in accordance with Table 1. To prepare the treatment solutions, concentrates A, B, C and D were produced and were diluted with deionized water to the concentrations shown in Table 1. The treatment was carried out by immersing the test specimens in the treatment solutions for 2 minutes at the temperatures shown. Test specimens treated using concentrate A only were sprayed with deionized water for 5 seconds after immersion. The other test specimens were rinsed first with tap water and then with deionized water after the treatment. In every case, the test specimens were dried for 30 minutes at 65° C. in a recirculating air drying cabinet. The test specimens were then coated with two different powder coatings:

powder coating 1: Polyester AKZO 34-9016 NE 83 white, baking temperature 180° C., baking time 12 minutes powder coating 2: Polyester TIGER, DRYLACK 19/40250, blue, RAL 5014, gloss, baking temperature 190° C., baking time 14 minutes.

To test adhesion, the test specimens were placed in boiling deionized water for 6 hours. After the test, paint adhesion to the surface was evaluated in accordance with DIN 53209 while under-paint creepage was evaluated in accordance with DIN 53167 after scraping away at a cut. The results are set out in Table 2 for the substrate AlMg1 and in Table 3 for the substrate AlMgSiO.5.

The concentrates used for preparing the treatment solutions had the following composition:

Concentrate A
5% by weight polyacrylic acid (PRIMAL®, Rohm & Haas)
0.07% by weight HF
94.93% by weight water Concentrate B
10.5% by weight poly(4-vinylphenol-N-methyl glucamine)
8.3% by weight propylene glycol monopropyl ether
0.3% by weight $H_3PO_4$
80.9% by weight water Concentrate C
8.5% by weight hexafluorotitanic acid
0.4% by weight $NH_3$
91.1% by weight water

TABLE 1

TREATMENT BATHS AND PROCESS PARAMETERS

| Test No. | Concentrate (Dilution) | Temperature ° C. | pH After Dilution |
|---|---|---|---|
| Comp. 1 | No after treatment | | |
| Example 1 | A (1.5% by vol.) | 35 | 3.5 |
| Example 2 | B (1.0% by vol.) | 45 | 8.0 |
| Example 3 | C (1.0% by vol.) | 35 | 4.5*) |
| Example 4 | D (1.0% by vol.) | 35 | 4.5*) |
| Example 5 | A (1% by vol.) + C (1% by vol.) | 35 | 4.0*) |
| Example 6 | A (1% by vol.) + D (1% by vol.) | 35 | 4.0*) |
| Example 7 | C (0.5% by vol.) + D (0.5% by vol.) | 35 | 4.5*) |
| Example 8 | B (1% by vol.) + D (0.5% by vol.) | 40 | 7.0*) |

*)pH value adjusted with ammonium hydrogen carbonate

Concentrate D
8.5% by weight hexafluorozirconic acid
0.4% by weight $NH_3$
91.1% by weight water

TABLE 2

TEST RESULTS ON THE ALLOY ALMG1

| Test No. | Powder Coating | Coating Thickness ($\mu$) | Surface After Boiling Test (DIN 53209) | Scratch After Boiling Test (mm Creepage, DIN 53167) |
|---|---|---|---|---|
| Comp. 1 | 1 | 84 | m0/g0 | 2.0 |
| | 2 | 74 | m0/g0 | 1.5 |
| Example 1 | 1 | 70 | m0/g0 | 0 |
| | 2 | 82 | m0/g0 | 0 |
| Example 2 | 1 | 68 | m0/g0 | 0 |
| Example 3 | 1 | 84 | m0/g0 | 0 |
| | 2 | 111 | m0/g0 | 0 |
| Example 4 | 1 | 80 | m0/g0 | 0 |
| | 2 | 85 | m0/g0 | 0 |
| Example 5 | 1 | 70 | m0/g0 | 0 |
| | 2 | 78 | m0/g0 | 0 |
| Example 6 | 1 | 85 | m0/g0 | 0 |
| | 2 | 93 | | |
| Example 7 | 1 | 72 | m0/g0 | 0 |
| | 2 | 69 | m0/g0 | 0 |
| Example 8 | 1 | 86 | m0/g0 | 0 |
| | 2 | 71 | m0/g0 | 0 |

TABLE 3

TEST RESULTS ON THE ALLOY ALMGS|0.5

| Test No. | Powder Coating | Coating Thickness ($\mu$) | Surface After Boiling Test (DIN 53209) | Scratch After Boiling Test (mm Creepage, DIN 53167) |
|---|---|---|---|---|
| Comp. 1 | 1 | 82 | m0/g0 | No adhesion |
| | 2 | 99 | m0/g0 | No adhesion |
| Example 1 | 1 | 87 | m0/g0 | 0 |
| | 2 | 93 | m0/g0 | 0 |

TABLE 3-continued

TEST RESULTS ON THE ALLOY ALMGS|0.5

| Test No. | Powder Coating | Coating Thickness (μ) | Surface After Boiling Test (DIN 53209) | Scratch After Boiling Test (mm Creepage, DIN 53167) |
|---|---|---|---|---|
| Example 2 | 1 | 80 | m0/g0 | 0 |
| Example 3 | 1 | 59 | m0/g0 | 0 |
|  | 2 | 90 | m0/g0 | 0 |
| Example 4 | 1 | 88 | m0/g0 | 0 |
|  | 2 | 67 | m0/g0 | 0 |
| Example 5 | 1 | 86 | m0/g0 | 0 |
|  | 2 | 74 | m0/g0 | 0 |
| Example 6 | 1 | 62 | m0/g0 | 0 |
|  | 2 | 79 | m0/g0 | 0 |
| Example 7 | 1 | 91 | m0/g0 | 0 |
|  | 2 | 83 | m0/g0 | 0 |
| Example 8 | 1 | 79 | m0/g0 | 0 |
|  | 2 | 71 | m0/g0 | 0 |

The invention claimed is:

1. A process for improving the adhesion of subsequently applied paint to an anodized metal surface after thin-layer anodization, said process comprising a step of contacting the anodized metal surface after thin-layer anodization with an aqueous solution containing one or both of the following groups a) and b of components:
   a) a.1) from 200 to 2,000 ppm of a homopolymer or copolymer of at least one of acrylic acid, methacrylic acid, esters of acrylic acid, and esters of methacrylic acid, said homopolymer or copolymer having an average molecular weight of 20,000 to 15,000; and
   a.2) from 5 to 50 ppm of hydrofluoric acid, anions thereof, or both hydrofluoric acid and anions thereof; and
   b) from 200 to 3,000 ppm in total of
   b.1) at least one of unneutralized hexafluorotitanic acid and hexafluorozirconic acid; and
   b.2) ammonium salts of at least one of hexafluorotitanic acid and hexafluorozirconic acid.

2. A process according to claim 1, wherein the aqueous solution contains component group a).

3. A process according to claim 2, wherein the aqueous solution also contains component group b).

4. A process according to claim 3 wherein the aqueous solution has a temperature of 25 to 55° C. when contacting, and the solution is allowed to contact the thin-layer-anodized metal surface for between 30 and 300 seconds.

5. A process according to claim 4, wherein after the contacting with said aqueous solution, the metal surface is sprayed or rinsed with water and dried at a temperature of 50 to 80° C.

6. A process according to claim 5, wherein the thin-layer anodization has been carried out under the following conditions.

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 A/dm$^2$, | to produce an anodized layer thickness of 3–8 μm.

7. A process according to claim 3, wherein the thin-layer anodization has been carried out under the following conditions:

| | |
|---|---|
| an electrolyte concentration of | 180–200 g/l $H_2SO_4$; |
| a max Al content of | 15 g/l; |
| a chloride content of | <0.1 g/l; |
| a temperature of | 25–30° C.; and |
| a current density of | 1.5–3 A/dm$^2$, | to produce an anodized layer thickness of 3–8 μm.

8. A process according to claim 2, wherein the aqueous solution has a temperature of 25 to 55° C. when contacting, and the solution is allowed to contact the thin-layer-anodized metal surface for between 30 and 300 seconds.

9. A process according to claim 8, wherein after the contacting with said aqueous solution, the metal surface is sprayed or rinsed with water and dried at a temperature of 50 to 80° C.

10. A process according to claim 9, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 A/dm$^2$, | to produce an anodized layer thickness of 3–8 μm.

11. A process a according to claim 8, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 A/dm$^2$, | to produce an anodized layer thickness of 3–8 μm.

12. A process according to claim 2, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 A/dm$^2$, | to produce an anodized layer thickness of 3–8 μm.

13. A process according to claim 1, wherein the aqueous solution contains component group b) and is free from homopolymers and copolymers, which have an average molecular weight of 20,000 to 150,000, of acrylic acid, methacrylic acid, esters of acrylic acid, and esters of methacrylic acid.

14. A process according to claim 13, wherein the aqueous solution has a temperature of 25 to 55° C. when contacting, and the solution is allowed to contact the thin-layer-anodized metal surface for between 30 and 300 seconds.

15. A process according to claim 14, wherein, after the contacting with said aqueous solution, the metal surface is sprayed or rinsed with water and dried at a temperature of 50 to 80° C.

16. A process according to claim 15, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 $A/dm^2$, | to produce an anodized layer thickness of 3–8 μm.

17. A process according to claim 13, wherein the thin-layer anodization has been carried out under the following conditions,

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 $A/dm^2$, | to produce an anodized layer thickness of 3–8 μm.

18. A process according to claim 1, wherein the aqueous solution has a temperature of 25 to 55° C. when contacting, and the solution is allowed to contact, the thin-layer-anodized metal surface for between 30 and 300 seconds.

19. A process according to claim 18, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 $A/dm^2$, | to produce an anodized layer thickness of 3–8 μm.

20. A process according to claim 1, wherein the thin-layer anodization has been carried out under the following conditions:

| | |
|---|---|
| an electrolyte concentration of | 180–200 g/l $H_2SO_4$; |
| a max. Al content of | 15 g/l; |
| a chloride content of | <0.1 g/l; |
| a temperature of | 25–30° C.; and |
| a current density of | 1.5–3 $A/dm^2$, | to produce an anodized layer thickness of 3–8 μm.

* * * * *